United States Patent
Kubo

[11] Patent Number: 5,569,388
[45] Date of Patent: Oct. 29, 1996

[54] METHOD OF CONTROLLING THE GROWTH OF MICROORGANISM IN A LIQUID WITH TOURMALINE CRYSTALS

[75] Inventor: Tetsujiro Kubo, Tokyo, Japan

[73] Assignee: Yugen Kaisha Kubo Technic Office, Tokyo, Japan

[21] Appl. No.: 466,984

[22] Filed: Jun. 6, 1995

Related U.S. Application Data

[63] Continuation of Ser. No. 274,361, Jul. 13, 1994, abandoned, which is a continuation of Ser. No. 949,372, Sep. 23, 1992, abandoned, which is a continuation of Ser. No. 660,022, Feb. 25, 1991, abandoned.

[30] Foreign Application Priority Data

Feb. 27, 1990 [JP] Japan ................................ 2-46449

[51] Int. Cl.$^6$ .................................................. C02F 1/68
[52] U.S. Cl. ............................................ 210/764; 205/753
[58] Field of Search .............................. 210/764; 205/753

[56] References Cited

U.S. PATENT DOCUMENTS

| | | | |
|---|---|---|---|
| 3,561,599 | 2/1971 | Sheen | 210/198.3 |
| 3,975,257 | 8/1976 | Hulse | 204/150 |
| 4,003,252 | 1/1977 | Dewath | 73/861.27 |
| 4,406,793 | 9/1983 | Kruyer | 210/693 |
| 4,904,394 | 2/1990 | Clarke et al. | 210/748 |
| 4,952,321 | 8/1990 | Bradshaw et al. | 210/679 |
| 5,108,618 | 4/1992 | Hirasawa | 210/689 |

OTHER PUBLICATIONS

New Technology Japan, vol. 18, No. 9, "Legionella Contamination Prevention for Cooling Systems", Dec. 1990.
Solid State Physics, vol. 24, No. 12, "Interface Activity of Water Given Rise to by Tourmaline", T. Kubo, Dec. 1989.
Nippon Shokuhin Kogyo Gakkaishi, vol. 38, No. 5, pp. 422–424, 1991. No month available "Surface Tension and Permeability of Water Treated by Polar Crystal Tourmaline".
Flowlet Water Activator, Product Brochure (English translation), publication date Jun. 1989 ("Brochure No. 1").
Flowlet Water Activator, Product Brochure (English translation), exact publication date unknown but sometime between Feb. to Jun. 1990 ("Brochure No. 2").
Flowlet Water Activator, Product Brochure (English translation), publication date May 1992 ("Brochure No. 3").
Flowlet Water Activator Product Brochure, with English translation, published after Dec. 1989.
English translation of another product brochure for Flowlet Activator, published after Dec. 1989.

*Primary Examiner*—Kathryn Gorgos
*Assistant Examiner*—Kishor Mayekar
*Attorney, Agent, or Firm*—Wenderoth, Lind & Ponack

[57] ABSTRACT

A method of electrodepositing removal of ionic material using tourmaline crystal and tourmaline crystal with electrodeposited metal according to the present invention utilize electrodepositing phenomenon whereby to the cathode (negative pole) of tourmaline permanent electrodes, the metallic ion which is anode ion having electric charge of the opposite character thereto is attracted, neutralized, and deposited as a metallic atom to form a metallic coating on the electrode surface.

Hereinafter a method of electrodepositing removal of ionic material using tourmaline crystal and the specific structure of tourmaline crystal with electrodeposited metal according to the present invention will be described in detail.

19 Claims, 1 Drawing Sheet

METHOD OF CONTROLLING THE GROWTH OF MICROORGANISM IN A LIQUID WITH TOURMALINE CRYSTALS

This application is a continuation of now abandoned application, Ser. No. 08/274,361, filed Jul. 13, 1994, which is a continuation of now abandoned application, Ser. No. 07/949,372, filed Sep. 23, 1992, which was a continuation of now abandoned Ser. No. 07/660,022 filed Feb. 25, 1991.

BACKGROUND OF THE INVENTION

1. Field of the Invention

The present invention relates broadly to tourmaline. A first and second aspect of the invention relate to a method of depositing removal of ionic material using tourmaline crystals for removing metals from a liquid such as water, while a third and fourth aspect of the invention relate to a tourmaline crystal with deposited metal for supplying metallic ions to a liquid such as water.

2. Description of the Prior Art

The applicant for the present invention has filed an application on Oct. 3, 1989 (Japanese Patent Application No. 257130/1989) for a patent on an invention, the title of which is "Interfacial Purifying Apparatus Using Tourmaline, Method thereof, and Tourmaline Granular Material" This invention relates to a method, apparatus and application thereof, utilizing a discovery of the inventor that an interfacial active function can be provided for a liquid such as water by the reaction of electrodes, that is, between the permanent electrodes contained in tourmaline and liquid molecules of water, etc., to produce a purified liquid, such as water or the like.

Traditionally, where metallic ions have been contained in water, there have been requirements for removing the heavy metal ions which are harmful to life and the metallic ions, such as iron, manganese, etc., which produce adverse effects when the water is used. There have been proposed various kinds of methods and apparatus for this purpose. The fundamental technique, however, is that solid particulates of metallic oxide and other compounds are produced in a solution using oxygen, chlorine, ozone, etc., and that these particulates are separated for removal by means of sedimentation and filtration.

With respect to the methods and apparatus for removing the metallic ions themselves, there have been known a method and apparatus using zeolite and a method using ion exchange resin. These methods and apparatus, however, have a disadvantage that the reduced adsorptivity and the deteriorated ion exchange resin cause considerable problems. Therefore, an aeration process using oxygen in the air is a more widely employed method.

Even with the aeration method, there are many instances in practice that before the oxidation has been completed, the treatment proceeds to the next step where the separation is performed and that the solid particles produced by the oxidation are too fine be sufficiently separated.

There are many reasons why these problems have been caused, but the principal reason is that the speeds of the oxidizing reaction and the resulting aggregation are not fast, requiring a certain period of time for the oxidation to complete its reaction. This slow reaction has been the greatest barrier for the prior art to overcome. In respect to the first, second and third aspects of the invention, methods and apparatus described above constitute their prior art. The prior art regarding the fourth aspect of the invention will subsequently be described.

As one of the typical examples of this prior art, there are a method and apparatus for dispersing an aqueous solution of copper sulfate to remove algae that has grown in a pond, lake, pool, cooling tower, etc. by its eradication. It is known that algae become almost eradicated by copper ion of extremely low concentration such as 5 ppb (1/1,000 of ppm). However, the dispersion of copper sulfate is not suited for uniformally producing such an extremely low concentration as this. It is difficult to dissolve copper ions widely in a large quantity of water only by dispersion. There is locally produced a high concentration of copper sulfate where sulfate ion becomes as concentrated as copper ion. This sulfate ion is harmful to life such as fish or people swimming in the pool. The supply of copper ions to water cannot be sustained, either. Of metallic salts, a water-soluble salt is employed (irrespective of whether it is easy to be dissolved of not), but only a metallic ion is needed for the eradication of algae and the object anion which is produced simultaneously should be a harmless one.

SUMMARY OF THE INVENTION

As a result, the above-mentioned interfacial purifying method and apparatus using tourmaline and tourmaline granular material were invented. This invention, however, did not, as its own objective, provide for the removal of metallic ions in a liquid or of charged fine particles in a liquid and for the supply of metallic ions to a liquid. Thus, aside from the above-mentioned invention, there has arisen a request for an invention such as given below.

In other words, to each of the tourmaline electrodes, fine particles having charges of the opposite character thereto are attracted and are electrically neutralized, thus being deposited and adhesively aggregated. Also, in the case of metallic ions, etc. in a liquid such as water, a metallic coating is produced to be deposited on the electrodes. Further, the metallic coating thus produced is in close contact with the negative pole of the electrode for a metallic ion having a positive charge, so that its resolution in a liquid such as water is restricted. This represents a character different from a metal which can usually be deposited electrically for plating and others.

From these points of view, there has been demand for the further development of the invention for many more utilizations and usages.

In other words, the desired aspects of the invention, which utilize the permanent tourmaline electrodes, are roughly divided into the two types described below.

A first aspect of the invention is that a charged substance such as an ionic substance, etc., contained in a liquid such as water is attracted to each of the tourmaline electrodes having a charge of the opposite character to the charged substance, and is neutralized and deposited on the electrode surface, or in the case of metallic ions in a liquid such as water, a metallic coating is produced on the electrode surface, i.e., so-called deposition and fixation. Utilizing these two properties, the invention provides for the purification of water, etc. as its object.

Then, a second aspects of the invention aims at utilizing for many usages the deposition and fixation of metal on each surface of the tourmaline electrodes together with the tourmaline itself having such metal therewith.

With these two points in view, the aspect of the invention such as described below have specifically been requested.

A. At first, an invention is desired, which can be employed for the eradication of algae and for pasteurization.

It is well known that copper ion is effectively used to remove algae grown in a lake, pond, water tank, etc. Traditionally the spreading of copper sulfate solution has been conducted. However, this method is harmful to life such as fish because sulfate ion is mixed with copper sulfate at the same time. It is also difficult to maintain a sustainable and uniform density of metallic ions, etc. with this method.

Meanwhile, the pasteurizing effect of silver ion is also well known. Metallic silver is insoluble in a liquid such as water, and a silver compound which is also highly insoluble such as $Ag(OH)_2$, etc. is produced on the surface of the metallic silver in a solution. Then silver is produced when this compound is further dissociated in a liquid such as water. It is known that the concentration of silver ion required for pasteurization is several ppb (5–10 ppb).

It should also be taken into consideration that a continuous intake of silver for long years results in a harmful deposition and accumulation in the inner tissues and organs of a human body. According to reliable publications on medical science, deposits of silver are observed in the cerebrum and other organs as a result of experiments using laboratory animals, and neuropathy and other unfavorable symptoms are reported. The relationship between an organism and silver will be understood much clearer in future, but the presence of silver and other metallic ions in drinking water which are ingested daily must be avoided because it may take several decades before the harm caused by its accumulation is understood.

B. Next is an invention on the application of tourmaline as a metal-carrier catalyst.

Many metals have already been used as catalysts, particularly metallic compounds including metallic oxide. Of its catalystic functions, oxiding reaction, reducing reaction, acid-base reaction, etc. are known. Also, the catalytic functions cover wide areas of vapor phase and liquid phase. These metallic catalysts are often used as a metal-carrier catalyst having metal deposited on the carrier surface. The catalyst thus produced is stronger than a metal and metallic compound individually, and not only can the active area be widened but its use, collection, and regeneration are easier. A carrier such as this should have a good adhesion to a metallic catalyst. Also, it should withstand a burning temperature for activation (700°–800° C. in a higher range) and severe conditions for use, such as a higher temperature, atmosphere and acid or alkali, etc.

C. Then, an invention is necessary for the application of controlling metallic ion in a liquid such as water to be used for agricultural, fishery, and biological industries.

In this respect, utilizing highly advanced artificial controlling techniques, there have been developed new agricultural, fishery, and biological technologies in recent years. In this case, a liquid such as water plays also an important role in supplying required components (nutrients). In a technology such as this, any harmful metallic ion or any excessive amount of metallic ion must be removed. Also, certain ions must be supplied or supplemented. If the amount of ion present is too great, it will become harmful to life or if the amount is not sufficient, it will result in a famine state. Further no harmful anion must be supplied with the metallic ion at the same time.

It is therefore necessary to control the supply or removal of the metallic ions.

D. There have been proposed in water treatment techniques various methods of removing heavy metals or heavy-metal ions contained in service water or waste water. In the present invention, the cathode (negative pole) in tourmaline is utilized for effectively and rapidly removing the metallic ion having a charge of the opposite character thereto.

For a metal which is not in an ionic state, the present invention is also applicable after it has been dissolved into the state of a metallic ion by use of an acid, etc. Particularly, this method is intended for the use in removing radioactive metals in the waste fluid discharged from atomic energy facilities, which has become a great concern in society today, and for fixing them permanently for storage.

A method of depositing removal of ionic material using tourmaline crystal and tourmaline crystal with desposited metal according to the present invention utilize an depositing phenomenon whereby, to the cathode (negative pole) of tourmaline permanent electrodes, the metallic ion which is an anion having an electric charge of the opposite,character thereto is attracted, neutralized, and deposited as a metallic atom to form a metallic coating on the electrode surface.

Hereinafter a method of depositing removal of ionic material using tourmaline crystal and the specific structure of tourmaline crystal with desposited metal according to the present invention will be described in detail.

At first, the method of depositing removal using tourmaline crystal according to the first aspect of the invention is described. In the first aspect, a solidified compound comprising fine tourmaline crystals electrically insulated therebetween with electric insulators is immersed in water or a water soluble, etc. containing electrically charged material such as an ion, etc.

Then, the electrically charged material contained in such liquid is attracted to each of the tourmaline electrodes having an electric charge of opposite character to the electrically charged material. Thus the electrically charged material contained in the liquid is removed by neutralizing, discharging, and depositing the electric charge on the electrode surface and further by fixation.

Next, the of a method of despositing removal of ionic material using tourmaline crystal according to the second aspect is described. In the present invention, fine tourmaline crystals are first immersed in a liquid such as water containing an electrically charged material such as an ionic material, etc. Then the electrically charged material contained in the liquid is attracted to each of the tourmaline electrodes having an electric charge of opposite character to the electrically charged material.

Thus the electrically charged material contained in the liquid is removed by neutralizing, discharging, and depositing the electric charge on the electrode surface and further by fixation.

Next, the structure of tourmaline crystal with desposited metal according to the third aspect is described. In the present invention, there is provided first a solidified compound comprising fine tourmaline particles electrically insulated therebetween with electric insulators, and then a metallic coating. This metallic coating is produced by attracting, discharging, depositing and fixing to the above-mentioned electrodes of the tourmaline crystal an electrically charged material such as an ionic material having the opposite character thereto from a liquid such as water.

Finally, the structure of tourmaline crystal with desposited metal according to the fourth aspect is described. In the present invention, there is first provided fine tourmaline crystal and then a metallic coating. This metallic coating is produced by attracting, discharging, depositing and fixing to the above-mentioned electrodes of the tourmaline crystal an electrically charged material such as an ionic material having the opposite character thereto from a liquid such as water.

A method of despositing removal of ionic material using tourmaline crystal and tourmaline crystal with desposited metal according to the present invention are structured as set forth above thereby providing functions given below.

In other words, the despositing phenomenon appearing on the electrode surface (cathode) of the tourmaline crystal is fundamentally the same as the phenomenon appearing in a case of so-called plating. The electrode surface of the tourmaline crystal is a surface composed of an inorganic substance of a complicated composition, and is electrically a dielectric having an extremely high d.c. insulation. It is slightly similar to the oxide electrode employed in electrolysis, etc.

The metallic coating produced by deposition on the electrode surface makes its surface a new electrode face to continue desposition of metallic ion, so that the metallic coating increases in thickness. This metallic coating will cease despositing when the coating reaches a certain thickness. The reason is yet to be ascertained but inferably a metallic compound coating having a high electric insulation is formed on the metallic electrode surface and the covering of this coating should be the cause. This metallic compound is a metallic passive state produced by the combination of metallic atom and anion in a water solution such as $OH^-$, $CO_2^-$, etc., and it is not easily soluble in water.

As described hereinabove, most metals used for plating technique and others can be desposited on the permanent electrodes contained in the tourmaline crystal. The major difference between this desposited metal and a metal produced by so-called plating is that the former is always in contact integrally with the permanent electrode surface even after desposition. This metallic coating is not only intensively fixed to the electrode surface but is influenced by the potential of the electrode which controls the metal not to become metallic ion soluble in a water solution, for example. Also, various chemical reactions appearing on the surface of the metallic coating are brought about by this influence of the electrode.

DETAILED DESCRIPTION OF THE PREFERRED EMBODIMENTS

In this respect, it was discovered by the Jacques and Pierre brothers in 1880 that tourmaline crystal shows electrification phenomena of piezoelectricity and pyroelectricity. In Japan, there is also a record showing that a stone, which attracts a piece of paper when rubbed, was discovered 200 years ago and that such stone was named the "denki ishi" or "electric stone".

There was an attempt to use this denki ishi or electric stone as a pressure sensor or an infrared sensor but crystal and ceramic materials having similar electric charges, which were discovered later, have been used more widely. Consequently while the denki ishi or electric stone remains as a precious stone due to the beautiful brightness of its crystal, it has no other uses than as an ore specimen at present.

This denki ishi or electric stone is called "tourmaline" outside Japan, and among the Japanese gem dealers, it is called "torumarin". In the geological and mineral societies, it is called denki ishi in Japanese or tourmaline in English. Tourmaline is a silicate mineral containing boric acid and belongs to the hemimorphic reflective form having three or six sides. This hemimorphic form is asymmetric vertically. The chemical formula is complicated. A typical formula thereof is given below.

$$3\{NaX_3Al_6(BO_3)_3Si_6O_{16}(OH_9F)_4\}$$

X=Mg, Fe, Li, etc.

The tourmaline crystals show various colors such as red, green, blue, black, etc. according to the kind of sign X (metallic element), and a single crystal may also show various colors in some case. Its specific gravity is 3.1–3.2. Its hardness is 7.0–7.5 by Morse scale, and it is slightly harder than quartz.

The fact that the tourmaline crystal shows piezoelectricity and pyroelectricity has already been described, but as results of several experiments, it was discovered by the inventor of the present application that unlike the electrification phenomena of static electricity, the tourmaline crystal has permanent electrodes at both ends thereof. Based on this new discovery, many important applications and usages have been developed. The intensity of the permanent electrodes contained in the tourmaline is extremely small as compared with the permanent magnetic pole of a permanent magnet. This weakness is probably be one of the reasons why it was not earlier discovered.

It is possible to extremely shorten the distance between two tourmaline electrodes by pulverizing the tourmaline crystal to produce fine crystals of several microns or less each. The intensity of the electric field generated between the electrodes is almost inversely proportional to the square of the distance between the electrodes. Hence the intensity of the electric field can be adjusted suitably for a desired use by making the crystals appropriately fine. Also, the number of microelectrodes in the unit space and face can be made extremely great in proportion to the number of crystals.

There has been no proper name to call such material as the tourmaline which contains permanent electrodes equivalent to the permanent magnet in magnetism. In English the term "permanent electlet" may correspond to the term "permanent magnet". In Japanese, the term "eikyu denseki" or "permanent electric stone" should be equivalent to the term "eikyu jishaku" or "permanent magnet". There have been no materials found other than the tourmaline, which contain permanent electrodes. However, in view of the fact that many products and applications have been developed since the permanent magnet was discovered, it is expected that many products and applications will be studied likewise and put into practice in due course of time following this discovery.

The inventor of the present application experimentally discovered earlier that an isolated $OH^-$ ion (hydroxylion) which does not contain any object cation is produced by reaction between the permanent electrodes of fine tourmaline crystals and water molecules and that this hydroxylion produces, though weak, a "material showing an interfacial activation" when it is combined with $H_2O$ molecule. Thus, the application for such invention was filed on Oct. 3, 1989 (Japanese Patent Application No. 257130/1989).

Therefore, here in the present application, the application of so-called desposition phenomenon will be described because this phenomenon has already been described earlier, i.e, utilizing further the permanent electrodes contained in the tourmaline, various metallic ions, etc. which are cation having charges of the opposite character are attracted to the cathode (negative pole) of the permanent electrodes contained in the tourmaline, and are electrically discharged, neutralized, and deposited as metallic atom to form a metallic coating on the electrode surface.

As described earlier, the desposition phenomenon on the electrode surface of the tourmaline crystal is the same phenomenon as so-called plating. The electrode face of the tourmaline crystal is a crystalline surface of an inorganic material having a complicated composition. The tourmaline crystal is electrically a dielectric having an extremely high d.c. insulation. It is similar to the oxide electrodes used for electrolysis, etc.

Such desposition phenomenon as this of metallic ion varies according to various conditions such as the conductivity of the metal, the discharging phase of the metallic ion, the speed of diffusion and movement in a solution, PH of the solution, agitation, etc. The respective lattice constants of the cathode tourmaline electrode surface and the metal desposited thereon differ greatly from each other. Thus, in order to provide an excellent adhesiveness for the metallic coating produced on the electrode surface by the desposition, it may also be necessary to relax the matching degree of the despositing face by the treatment in a solution having a low metallic ion density.

Besides, in order to increase the desposition efficiency, the various methods given below, which are already in use for plating techniques, can be utilized. ① liquid agitation; ② temperature; ③ metallic ion density; ④ PH; ⑤ additives; and ⑥ electrode surface cleaning, etc.

As set forth above, most metals which are employed in "plating technique", etc. can electrically be deposited on the permanent electrode contained in the tourmaline crystal. The difference between this desposited metal and the one produced by so-called plating is that the former is always integrated with the electrode surface called permanent electrode after having been desposited thereon. This metallic coating is not only intensively fixed to the electrode surface but is under the influence of potential to control metal not to be dissolved in a water solution as metallic ion. Also, various chemical reactions appearing on the surface of this metal coating are produced under the influence of this electrode.

Here the application of the desposition of metallic ion on the permanent electrode contained in tourmaline crystal will be described.

A. The utilizations of the desposition of metallic ion, etc. on the permanent electrode of the tourmaline.

a) With the desposition and fixation of metallic ion of heavy metal, etc. contained in service water or waste water on the tourmaline crystal electrode, it is possible to remove these metallic ions from liquid such as water. The metal electrically deposited and fixed is easily soluble by strong acid and is reusable.

b) Solid metal and metallic colloidal particles contained in a liquid such as water are once dissolved by use of acid, etc. and are converted into metallic ion. Subsequently, with the method described in the preceding paragraph a), this metallic ion is electro desposited and fixed, and is removed from a liquid such as water.

c) Radioactive metal contained in a waste liquid used for atomic power generation is desposited by methods such as described in the preceding paragraphs a) and b), etc. for fixation, condensation and separation.

d) With the same method as describe in the preceding paragraph c), a metal having a specific radioactivity such as radioactive cobalt, etc. can be deposited and fixed on the tourmaline crystal electrode. This can be utilized in the medical field.

B. The utilization of tourmaline with desposited metals as a metal carrier.

a) The utilization of tourmaline with desposited copper is first described in respect to the alga eradication.

It is well known that copper ion is effectively applicable to preventing algae from being grown in a lake, pond, water tank, etc., or to remove them therefrom once grown. Traditionally, spreading, etc. of copper sulfate solution has been performed for the purpose. This method, however, is harmful to life such as fish because sulfate ion is mixed at the same time in addition to copper sulfate. The concentration of copper ion required for the alga eradication is only several ppb (ppb is $1/1,000,000,000$).

The metallic copper desposited on the cathode tourmaline electrode produces basic carbonic copper—$CuCO_3 \cdot Cu(OH)_2$—on its surface. This substance is extremely stable and is insoluble in water. However, it is slightly soluble in a water containing carbonic acid. The solubility is approximately 0.003 gr/100 gr as a concentration of basic carbonic copper.

This concentration is as high as 100–1,000 times the concentration of copper ion needed to cause algae to be destroyed, which is as low as several ppb. The potential on the cathode tourmaline electrode controls the metallic copper Cu not to be dissolved into water by allowing it to become $Cu^{++}$ ion having positive charge, thus making the basic carbonic copper on the electrode surface more insoluble. This means that any useless solution of copper ion can be prevented appropriately when it is used for the alga prevention. Also, substances, which are produced at the same time that this basic carbonic copper is dissolved, are carbonic ion, oxygen, and hydrogen, and no substance harmful to life is produced.

b) Next, the utilization of tourmaline with desposited silver for pasteurization is described.

It is well known that silver ion is effective for pasteurization. A familiar example is silver-added active carbon used for a home water purifier, etc. Metallic silver is insoluble in water. However, it produces insoluble silver compound in water, such as $Ag(OH)_2$, etc. This compound is further separated and dissolved in water to produce silver ion. The concentration of silver ion needed for the alga prevention is made public as several ppb (5–10 ppb).

Silver is not a so-called "essential metal" such as iron, copper, zinc, etc. needed for the vital activity of a living body. This is the same as cadmium, mercury, etc., and caution must be exercised with these metals because of the harm caused by the deposition and accumulation of silver in the inner tissues and organs of a human body resulting from its continuous intake for long years. According to reliable publications on medical science, deposition of silver are observed in the cerebrum and other organs as a result of experiments using laboratory animals, and neuropathy and other unfavorable symptoms are reported. The relationship between organism and silver will be understood much clearer in the future, but the presence of silver in drinking water and the presence of other metal ions as well which are taken in daily must be avoided because there is a case where it may take several decades before the harm caused by its accumulation is understood.

In addition to the above, there are following applications utilizing the pasteurizing effect of silver ion.

① Cooling tower (used in combination with the alga prevention effect of the copper ion).

② Pool water (used in combination with chlorine sterilizer. Use of chlorine agent should be minimized. Only silver ion can be employed. In an outdoor pool, it should be used with copper ion to prevent algae from being grown).

③ Shower water, flush toilet water and cleaning water for heated water commode.

④ Bath room (home and public)

⑤ Various cleaning water, washing water, and hospital water.

⑥ Sterilization of discharged water after waste water treatment in various scales, large or small.

⑦ Sterilization for water treatment for medium scale running water, etc. (may be used in combination with copper ion for the alga prevention).

⑧ Water for tooth brushing and cleaning mouth, and use for laundry, etc.

⑨ Use for emergency water tank.

⑩ Sterilization of drinking water for use in a short period such as traveling, leisure, etc.

In order to deposit silver on tourmaline, most water soluble silver compounds can be utilized. While a typical example is silver nitrate used for silver plating, waste liquids obtainable from other silver platings and photographic industry can also be utilized. The potential on the tourmaline electrode surface controls the silver solution, and no harmful acid, cyanide, etc. are produced when the dissolution occurs in a liquid such as water as in the case of the copper ion described in the preceding paragraph.

c) The utilization as a supply source of the essential metals needed to maintain life (including plants and microorganism) is described.

All the creatures living on the earth, irrespective of animals, plants or micro-organisms, have functions to absorb, through the transmission of cell membranes of the respective creatures, various ions, chiefly nitric acid, ammonia, phosphoric acid, potassium, sulfuric acid, magnesium, iron, manganese, copper, boron, chlorine, molybdenum, and many other elements. These elements thus absorbed become constituents of living body or assume essential parts to perform metabolic functions and are important to maintain life. Several of these metals are called "essential metals" which are essential, though in small quantities, to the maintenance and growth of the living creatures.

In recent years, we have been developing new agricultural, fishery, and biological techniques for our own food productions utilizing the natures such as land, sea, river, etc. and the highly artificial controlling techniques. In this case, a liquid such as water still has an important role to supply essential components (nutriments).

In a technique, such as this, some metallic ions must be removed or some must be supplied. Also, the quantity contained should be appropriate. It becomes harmful, if it is too great or results in a famine state if it is insufficient. Besides, the essential metallic ion must be supplied without any harmful anion at the same time. Such control as this is possible by despositing metallic ion to be fixed on the tourmaline electrode. The metal thus fixed on the electrode is also dissolved as ion gradually in a liquid such as water. These two characteristics are utilized for performing a fine control of the amount of metallic ion in a liquid such as water by combining them appropriately.

d) Next, a metal-carrier catalyst with tourmaline as its carrier is described.

Metals have already been used as catalysts, particularly metallic compounds including metallic oxide. Of its catalytic functions, oxiding reaction, reducing reaction, acid-base reaction, etc. are know. Also, the catalytic functions cover wide areas of vapor phase and liquid phase. These metallic catalysts are often used as a metal-carrier catalyst having metal deposited on the carrier surface. The catalyst thus produced is stronger than a metal only, and not only the active area can be widened but its use, collection, and regeneration are easier. A catalyst such as this should have a good adhesion to a metallic catalyst. Also, it should withstand a burning temperature for activation (700°–800° C. in a higher range) and severe conditions for use such as a higher temperature, atmosphere and acid or alkali, etc. Tourmaline has excellent characters as a carrier in this point. The temperature at which its permanent electrode is lost is between 950° and 1,000° C., and it is has a sufficient heat resistivity when it is used at temperatures lower than 900° C. Also, it has a better characteristic than quartz against acid, alkali, etc.

In order to produce a metal-carrier catalyst such as this, water-soluble salts of such metal are used.

A metal-carrier catalyst is produced by burning further the fine crystalline particles of tourmaline with desposited metal obtained or sintered ceramic substance including such particles at a temperature required to obtain catalytic activation. Most transition metals can be used for this purpose. For its shapes, particle, grain, plate, pipe, honeycomb, etc. made of ceramic or glass are all usable, and in the case of temperatures lower than 200° C., plastic can be used as a forming material.

Further, it is possible to use this by mixing with plastic or texture having low heat resistivity or by coating, etc. utilizing a metal-carrier catalyst which has already obtained its catalytic activation by pre-heating. The usages of these catalysts are the same as those of the metal-carrier catalysts and metallic catalysts currently in use.

Hereinafter a tourmaline crystal of the present invention, i.e., a compound chiefly comprising tourmaline crystals as an aggregate of granules will be described in detail according to an embodiment combined with the invention disclosed in the above-mentioned Japanese Patent Application No. 257130/1989 in conjunction with the accompanying drawings.

Figure 1:
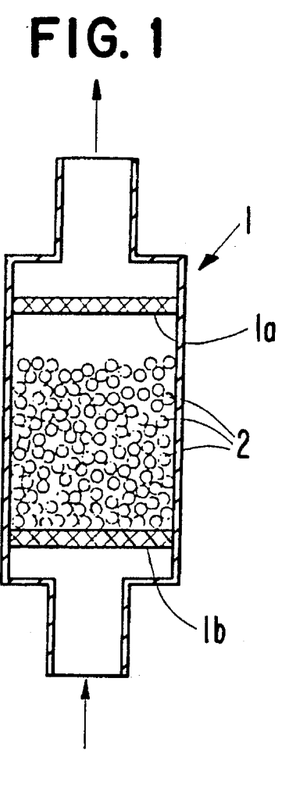
FIG. 1 is a cross-sectional side view showing an embodiment of aggregate of granules used in combination with a method of depositing removal of ionic material using tourmaline crystal according to the present invention.
Figure 2:
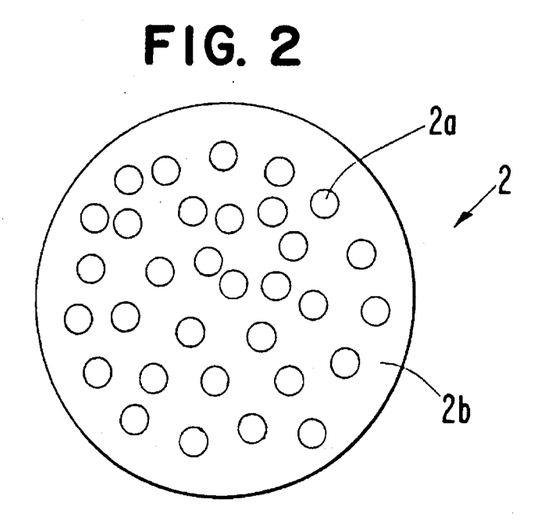
FIG. 2 is an enlarged side view showing the granule shown in FIG. 1.
Figure 3:
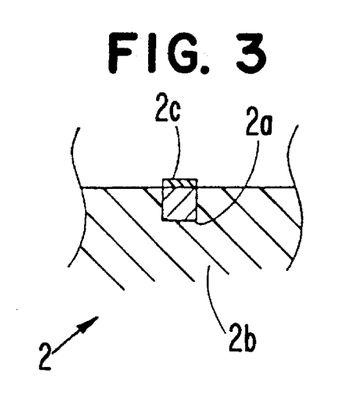
FIG. 3 is a partially cross-sectional side view illustrating the granule shown in FIG. 2.

FIG. 1 is a cross-sectional side view showing an embodiment of the aggregate of granules used for an electrodes-positing removal method using tourmaline crystal according to the present invention. FIG. 2 is an enlarged side view of a granule or spherical pellet shown in FIG. 1. FIG. 3 is a partially cross-sectional side view of the granule shown in FIG. 2.

At first, a device 1 having a simple structure as shown in FIG. 1 is prepared, and on the top and bottom ends thereof, orifices 1a and 1b allowing only water to pass therethrough are provided. Then, the ascending flow of water is passed through a fluidized layer such as this. The invention is based on an anticipated phenomenon to be generated by the water passing through this device 1 and the reaction across the tourmaline electrodes on the surface of the free bodies of tourmaline granules 2. Between fine tourmaline crystals are filled in with ceramic 2b having higher electric insulation to prevent the fine tourmaline crystals 2a on the surface of the tourmaline granules 2 from being placed too close to each other in order not to offset electrodes having opposite characters. FIG. 2 illustrates such state, and desirably the tourmaline electrodes on the surface should be as many as possible. An appropriate quantity of tourmaline contained should be approximately 5–10% of the entire quantity of the granules. Also, the size of the fine crystal used should be several microns.

Here the tourmaline granules are provides in a manner given below.

At first, an igneous rock containing approximately an 8–10% of iron tourmaline is crushed into pieces of approximately 5–10 cm each. Then, by visual selection, the pieces containing more tourmaline are selected for experiment.

A blue solution characteristic of copper ion is prepared by dissolving 2 g of copper sulfate in 1,000 cc of a refined water (deionized water). Then 500 g of the aforesaid crushed stones containing tourmaline are immersed in this solution and left for 24 hours. The blue color characteristic of copper ion then disappears and the solution becomes colorless and transparent. When the solution is further left for three days as it is, the black tourmaline portion on the surface of the crushed pieces is changed into green. This color is so-called verdigris characteristic of basic carbonate $[5H_2O \cdot CuCO_3 \cdot Cu(OH)_2]$. This shows that the copper ion in the copper sulfate solution has been electrodesposited on the portion corresponding to the cathode tourmaline electrode (negative pole). There is also a portion where the slime tourmaline is exposed but no such electrodesposition is observed at all. Such portion corresponds to anode (positive pole) having the same charge as the copper ion which is anion.

Subsequently the above-mentioned crashed stones are left for an hour respectively at 900° C., 950° C., 1,000° C., and 1,050° C., and then cooled gradually. Using these four specimens, the same immersing experiment as the aforesaid 1 is conducted. As a result, no changes are observed in colors of copper sulfate solutions in which the specimens of 1,000° C. and 1,050° C. have been immersed. The temperature at which the permanent electrodes are lost is considered to be between 950° and 1,000° C. The experiment, which has indicated the presence of a temperature equivalent to the Curie temperature, is repeated for the electrodespositions of several different kinds of metals (such as copper, silver, nickel, etc.), and the measurements are conducted by chemically analyzing each quantity of the desposition. The observation shows that all tourmaline crystals have the permanent electrodes and that there is the presence of a temperature equivalent to the Curie temperature at which the permanent electrodes are lost.

The tourmaline crystals with desposited metals according to the present invention are not limited to an aggregate elf granules as shown in the present embodiment as a matter of course but can be used with various other types such as honeycomb, fine crystals, etc.

Subsequently the outlines of experiments for each of the embodiments and the results thereof will be described.

(1) Deposition and elution of copper ion.
I. Experiment on copper ion desposited on cathode tourmaline electrode (negative pole).

① A water solution of thin blue is prepared by dissolving 2 gr of copper sulfate in 1,000 cc of distilled water.

② Sintered ceramic balls (powdered granite 45%, alumina 25%, and silica 25%) containing approximately a 4% of fine tourmaline crystals are used. This ball has a diameter of 3.2 mm on the average; specific gravity, approximately 3.0; and brown in color.

In a copper sulfate solution of 1,000 cc prepared as above, 200 gr of the ceramic balls containing tourmaline are immersed, and are continuously agitated respectively for one hour, five hours and 24 hours taking a precaution not to allow the agitator blades to contact the ceramic balls. When the agitation is completed, the ceramic balls are removed, and the amount of copper in the remaining solution is analyzed. The results thereof are stated in Table 1 shown in a later page hereof.

II. Experiment on the elution of copper desposited on the tourmaline electrodes of the ceramic balls.

200 gr of the ceramic balls with the desposited copper which has been produced by the same method as the experiment in the preceding paragraph are immersed in 1,000 cc of distilled water and are continuously agitated in the same manner as in the experiment I mention above. After the agitation for one hour, five hours, and 24 hours, the ceramic balls are removed. Then the amount of copper in the remaining liquid such as water is analytically determined by the normal method. The results thereof are stated in Table 2 shown in a later rage hereof.

(2) Deposition and elution of silver ion.
I. Experiment on silver desposited on the cathode (negative pole) of the permanent electrodes of tourmaline.

① A silver nitrate solution is prepared by dissolving 2 gr of silver nitrate in 1,000 cc of distilled water.

② 200 gr of the same ceramic balls used for the experiment (2) are immersed in 1,000 cc of silver nitrate solution and are continuously agitated. When the agitation is completed, the quantity of silver in the remaining solution is analytically determined. The results thereof are stated in Table 3 shown in a later page hereof.

II. Experiment on elution of silver desposited on the tourmaline electrodes (cathode) of ceramic balls.

A similar experiment for copper performed in the above-mentioned (2) is conducted. The results thereof are stated in Table 4 shown in a later page hereof.

The desposited amount of silver applied to the ball is 0.48 mg/gr prior to being used for this experiment.

(3) Alga eradication and pasteurization.
I. Alga eradication using ceramic balls with desposited copper.

This experiment is carried out in an actual pond of 2,500 $m^3$ for a period of approximately nine months (shown in Table 7).

II. Experiment on pasteurizing effect.

a) The ceramic balls with desposited silver prepared by the method described in the above-mentioned experiment (2) are weighed respectively for 1 gr and 5 gr and are immersed each in 1,000 cc of water containing bacteria beforehand. Then the agitations are conducted in the same manner as the experiments hitherto undertaken. The results thereof are stated in Table 5 shown in a later page hereof.

A similar experiment is conducted using ceramic balls with desposited copper but no effect is observed at all even for 50 gr/l.

b) A solution is prepared by immersing in 1,000 cc of distilled water 10 gr of ceramic balls with the desposited silver produced by a similar method as in the above-mentioned experiment (2) and by agitating the solution for two hours.

Against a portion of solution containing the above-mentioned silver ion, a water containing bacteria is mixed to make its portions 10 times and 100 times, and the mixtures are agitated for 10 minutes. Then the numbers of bacteria are counted for colon bacillus group and general bacteria. The results ate stated in Table 6 shown in a later page hereof.

As the above describes, the results of these experiments can be considered:

① It is clear that silver and silver ion contained in water solutions of copper and silver soluble salts are desposited on the cathode electrodes of the tourmaline permanent electrodes.

② This fact verifies that tourmaline contains "permanent electrodes" corresponding to permanent magnets.

③ As a result of the pasteurization experiments using silver ion, it is clear that for obtaining a pasteurizing effect a certain time is required to allow a contact between a concentration of silver ion and bacteria. For an extremely short time or instantaneously, no sufficient effect can be expected.

④ While the actual test in a pond mentioned above results in a greater success than anticipated, the consumption of deposited copper is not even; a great elution is observed at the beginning, but it becomes small as time elupes and finally it becomes extremely small as given below.

The ceramic balls employed for the above-mentioned actual test in a pond were a prototype product prepared at an early stage, and the quantity of desposited copper was less than a half of those used for the experiments described herein.

The quantity of electrodesposited

| copper prior to use | 0.06 mg/gr |
| After use in 100 days | 0.04 mg/gr |
| After use in 300 days | 0.0139 mg/gr |

For reference, the quantity of desposited copper of the ceramic balls used for several experiments described herein is approximately 0.15 mg/gr and it is approximately 2.5 times the above-mentioned balls employed for the actual test in the pond.

In this respect, the conditions given for the actual test in the pond are as follows:

A. Size of the pond, etc.

| Area | 1,500 m$^2$ |
| Average depth | 50–60 cm |
| Total quantity of water | Approximately 1,000 m$^3$ |
| Living creatures | 1,000 colored carps, etc. |

The total quantity of water should be replaced by ground water in every three days completely according to the calculation.

B. Operation of circulating filter pump.

Eight-hour operation per day. The total quantity of water is completely circulated for filtration once a day.

C. Water transparency.

By eye-sight, the water is transparent but dead leaved of indeciduous trees, dusts, and dead algae are floating. Therefore, the transparency is reduced to approximately 60 cm as a measured value. The conductivity is 30 μs/cm in January and 33 μs/cm as of March, and the DO and the contamination of water itself does not advance. However, one to two months thereafter, these dusts (dead leaves and dead algae) are flown away by the overflown waste water, and the transparency is restored to almost 80 cm to 100 cm.

D. Period of experiment.

At the end of January, 1989, a flow magnetic water activator using an aggregate of granules of tourmaline crystals with desposited metal as mentioned above was installed in the pump chamber. Then, for approximately eight months to the end of September in 1989, the experiments were carried out through the four seasons, winter, spring, summer, and fall. Three times a month, environmental temperature, water temperature, PH, dissolved oxygen (DOppm), conductivity (μs/cm), transparency (cm) and the growing condition of algae, etc are observed by eye-sight, and the average values are listed.

This summer, due to an abnormal water famine, the ground water became abnormal resulting in lowering transparency and DO temporarily (July–August), but no abnormality was observed in the growth of carps in the pond.

E. On Oct. 23, 1989, the operation of the flow magnetic water activator using granules containing tourmaline was terminated, and the experiment was suspended. Then, copper desposited billet (30 kg) was withdrawn from the pond. After that, the conditions of the pond were observed with the results given below.

| 1. | PH | 8.1 → 7.9 |
| 2. | DO | 8.4 ppm · 5.6 ppm |
| 3. | Transparency | 60 cm · 80 cm |
| 4. | Algae started growing again | |
| | 10 days later | Approximately 2 cm |
| | 20 days later | Approximately 4 cm |
| | 30 days later | Approximately 6 cm |

The above results again verified that the effects of the above-mentioned flow magnetic water activator and copper desposited billet. On Dec. 19, 1989, the facilities were restored. All the data are stated in Table 7 shown in a later page hereof.

In this respect, the state of desposited metal 2c is shown in FIG. 3 for further reference.

TABLE 1

| Item No. | Presence of immersed substance | Immersing period | Copper (Cu) in solution | Copper deposition on ceramic ball |
|---|---|---|---|---|
| 1 | No ceramic balls | 0 hour | 512 mg/l | 0 |
| 2 | Immersed | 1 hour | 488 mg/l | 0.12 mg/gr |
| 3 | Immersed | 5 hours | 483 mg/l | 0.145 mg/gr |
| 4 | Immersed | 24 hours | 482 mg/l | 0.15 mg/gr |

TABLE 2

| Item No. | Ceramic balls | Immersing and agitating period | Copper density in solution | Elution of ceramic balls per 1 gr |
|---|---|---|---|---|
| 1 | 200 g/l | 1 hour | 1.25 mg/l | 0.0063 mg/gr |
| 2 | 200 g/l | 5 hours | 1.29 mg/l | 0.00645 mg/gr |
| 3 | 200 g/l | 24 hours | 1.39 mg/l | 0.00675 mg/gr |

TABLE 3

| Item No. | Immersing and agitating period | Ag in solution mg/l | Deposition on ball (calculated value) |
|---|---|---|---|
| 1 | 0 hour | 1280 mg/l | 0 mg/gr |
| 2 | 5 hours | 1200 mg/l | 0.4 mg/gr |
| 3 | 24 hours | 1190 mg/l | 0.45 mg/gr |
| 4 | 48 hours | 1190 mg/l | 0.45 mg/gr |

TABLE 4

| Item No. | Immersing and agitating period | Silver density in solution | Silver elution from ball |
|---|---|---|---|
| 1 | 0 hour | 0 mg/l | 0 mg/l |
| 2 | 2 hours | 8.92 mg/l | 0.0446 mg/gr |
| 3 | 24 hours | 12.0 mg/l | 0.06 mg/gr |

(Ceramic ball with silver deposition is used)

TABLE 5

| Item No. | Left period | Number of general bacteria | |
|---|---|---|---|
| | | balls 1 gr/l | balls 5 gr/l |
| 1 | Prior to test | 3400 | 3400 |
| 2 | Immediately after immersion of balls | 2800 | 160 |
| 3 | 2 hours | 14 | 0 |
| 4 | 5 hours | 1 | 0 |

TABLE 6

| No. | Mixing ratio | *Colon bacillus* group | General bacteria | Remarks |
|---|---|---|---|---|
| 1 | Blank | 264 | 7 × 10³ | |
| 2 | 10:1 | ~ | 17 × 10² | |
| 3 | 100:1 | 189 | 7 × 10³ | No difference from Blank |

(Ceramic ball with silver deposition is used)

TABLE 7

| Date | Atmospheric temperature | Water temperature | PH | DO ppm | Conductive ratio μS/cm | Transparency cm | State of alga growth |
|---|---|---|---|---|---|---|---|
| 1/14–30 | 9 | 11 | 6.8 | 4.5 | 30 | 100 | Algae already grown at this time Length 10–15 mm |
| 1/31 | | Equipment installed | | | | | |
| February | 11.0 | 12.0 | 7.0 | 4.5 | 30 | 95 | |
| March | 16.0 | 15 | 7.3 | 4.9 | 33 | 60 | - Most active period of algae 30–100 mm |
| April | 19.0 | 20 | 7.4 | 5.6 | 35 | 35 | - Algae started to be cut short (alga removal) |
| May | 25.0 | 23 | 7.5 | 6.2 | 37 | 70 | - Removal of algae expanded all over 2–3 mm |
| June | 27 | 24 | 7.6 | 6.5 | 32 | 85 | Length of algae 1–2mm |
| July | 32 | 28 | 8.0 | 7.0 | 35 | 65 | Removal of algae almost completed |
| August | 34 | 30 | 8.1 | 6.2 | 36 | 47.5 | Removal of algae almost completed |
| September | 29 | 23.3 | 8.1 | 8.4 | 36 | 80 | Removal of algae almost completed |

I claim:

1. A method of supplying an electrically charged substance to a liquid, comprising the steps of:

immersing in a liquid a plurality of free bodies having both positive and negative electrically charged surfaces and having deposits of, an electrically charged substance on the oppositely charged surfaces of the free bodies, where the electrically charged substance is dissolved into the liquid, the free bodies comprising a plurality of fine tourmaline crystals each possessing positive and negative poles which crystals are insulated from one another by an electrically insulating material, such that the positive and negative electrically charged surfaces of the free bodies are positive and negative poles of tourmaline crystals which are exposed on the surfaces of the free bodies.

2. The method according to claim 1, wherein the plurality of free bodies are agitated in the liquid, hastening the dissolution of the electrically charged substance into the liquid.

3. The method according to claim 1, wherein the electrically charged substance is a metallic ion.

4. The method according to claim 1, wherein the electrically charged substance is at least one selected from the group consisting of silver, copper, potassium, magnesium, iron, manganese, boron, molybdenum, chlorine, sulfuric acid, phosphoric acid, nitric acid, and ammonia.

5. The method according to claim 1, wherein the free bodies are spherical pellets about 3.2 mm in diameter and comprise about 4–10% of fine tourmaline crystals which are several microns in size and which are electrically insulated from one another by a ceramic material.

6. A method of supplying an electrically charged substance to a liquid comprising the steps of:

immersing in a liquid a plurality of fine tourmaline crystals possessing positive and negative poles and having deposits of, an electrically charged substance deposited on the oppositely charged poles of the crystals, where the electrically charged substance is dissolved into the liquid.

7. The method according to claim 6, wherein the plurality of fine tourmaline crystals are agitated in the liquid, hastening the dissolution of the electrically charged substance into the liquid.

8. The method according to claim 6, wherein the electrically charged substance is a metallic ion.

9. The method according to claim 6, wherein the electrically charged substance is at least one selected from the group consisting of silver, copper, potassium, magnesium, iron, manganese, boron, molybdenum, chlorine, sulfuric acid, phosphoric acid, nitric acid, and ammonia.

10. The method according to claim 6, wherein the fine tourmaline crystals are several microns in size.

11. A method of controlling growth of a microorganism in a liquid, which comprises the steps of:

immersing a plurality of free bodies in a liquid, the free bodies having both positive and negative electrically charged surfaces and having deposits of an electrically charged substance on the oppositely charged surfaces of the free bodies, the electrically charged substance being effective in controlling microorganism growth, so that an effective amount of the electrically charged substance is dissolved into the liquid to control microorganism growth, the free bodies comprising a plurality of fine tourmaline crystals each possessing positive and negative poles which crystals are insulated from one another by an electrically insulating material, such that the positive and negative electrically charged surfaces of the free bodies are positive and negative poles of tourmaline crystals which are exposed on the surfaces of the free bodies.

12. The method according to claim 11, wherein the plurality of free bodies are agitated in the liquid, hastening the dissolution of the electrically charged substance into the liquid.

13. The method according to claim 11, wherein the electrically charged substance is at least one of silver and copper ion.

14. The method according to claim 11, wherein the free bodies are spherical pellets about 3.2 mm in diameter and comprise about 4–10% of fine tourmaline crystals which are several microns in size and which are electrically insulated from one another by a ceramic material.

15. A method of controlling growth of a microorganism in a liquid, which comprises the steps of:

immersing a plurality of fine tourmaline crystals in a liquid, the crystals possessing positive and negative poles and having deposits of an electrically charged substance on the oppositely charged poles of the crystals, the electrically charged substance being effective in controlling microorganism growth, so that an effective amount of the electrically charged substance is dissolved into the liquid to control microorganism growth.

16. The method according to claim 15, wherein the plurality of fine tourmaline crystals are agitated in the liquid, hastening the dissolution of the electrically charged substance into the liquid.

17. The method according to claim 15, wherein the electrically charged substance is at least one member selected from the group consisting of silver and copper ion.

18. The method according to claim 15, wherein the fine tourmaline crystals are several microns in size.

19. The method according to claim 15, wherein the microorganism is at least one member selected from the group consisting of algae and bacteria.

* * * * *